United States Patent [19]

So

[11] Patent Number: 4,996,281

[45] Date of Patent: Feb. 26, 1991

[54] POLYMERS CONTAINING AMIDE MOIETIES AND A PROCESS FOR THEIR PREPARATION

[75] Inventor: Ying H. So, Midland, Mich.

[73] Assignee: The Dow Chemical Company, Midland, Mich.

[21] Appl. No.: 414,847

[22] Filed: Sep. 29, 1989

[51] Int. Cl.$^5$ .............................................. C08G 18/60
[52] U.S. Cl. ........................................ 528/73; 528/44; 528/408; 528/361; 528/172
[58] Field of Search ..................... 528/73, 44, 408, 361

[56] References Cited

U.S. PATENT DOCUMENTS

| | | |
|---|---|---|
| 3,625,992 | 12/1971 | Ando . |
| 4,369,302 | 1/1983 | Ikegucyi et al. ....................... 528/73 |
| 4,391,957 | 7/1983 | Becker . |
| 4,472,567 | 9/1984 | Zecher et al. . |
| 4,785,070 | 11/1988 | Rasmussen et al. ................... 528/73 |

OTHER PUBLICATIONS

Papadopoulos, *Reactions of Imidazoles with Isocyanates at Elevated Temperature J. Org. Chem.*, vol. 42, No. 24, 1977, 3925–3929.
Kikugawa, A Facile N-Alkylation of Imidazoles and Benzimidazoles, Synthesis, 124–125.
Chemical Abstract 105089t, *Synthesis of 5,5'(or 6,6')-Bibenzimidazole from Non-Carcinogenic Compounds.*

*Primary Examiner*—Maurice J. Welsh
*Assistant Examiner*—Duc Truong
*Attorney, Agent, or Firm*—Ann K. Galbraith

[57] ABSTRACT

A polymer comprising a backbone portion containing at least one amide moiety and a plurality of imidazole, benzimidazole, benzoxazole, or benzothiazole moieties is prepared by contacting a polyisocyanate with a compound containing at least two end moieties selected from the following: imidazole, benzimidazole, benzoxazole, or benzothiazole, under reaction conditions sufficient to form the corresponding polymer containing amide moieties are disclosed. The process of the invention is suitable for the preparation of thermoset polymers which are advantageously free of surface defects, since a solvent is not required and no volatiles are evolved during the curing process. Urethane and/or urea polymers comprising a backbone portion containing at least one urea or urethane moiety, at least one amide moiety, and a plurality of imidazole, benzimidazole, benzoxazole, or benzothiazole moieties are also disclosed.

15 Claims, No Drawings

POLYMERS CONTAINING AMIDE MOIETIES AND A PROCESS FOR THEIR PREPARATION

BACKGROUND OF THE INVENTION

This invention relates to polymers containing amide moieties and a process for their preparation. More specifically, this invention relates to polymers containing amide and imidazole, benzimidazole, benzoxazole, or benzothiazole moieties and a process for their preparation. These polymers may be useful in coatings, adhesives, composites, and as prepolymers in polyurea/urethane systems.

P. Papadopoulos, "Reactions of Imidazoles with Isocyanates at Elevated Temperature", 42 *J. Org. Chem.* 3926 (1977) describes a process for reacting imidazoles

SUMMARY OF THE INVENTION

This invention is, in one aspect, a polymer comprising a backbone portion containing a plurality of at least one of the following units:

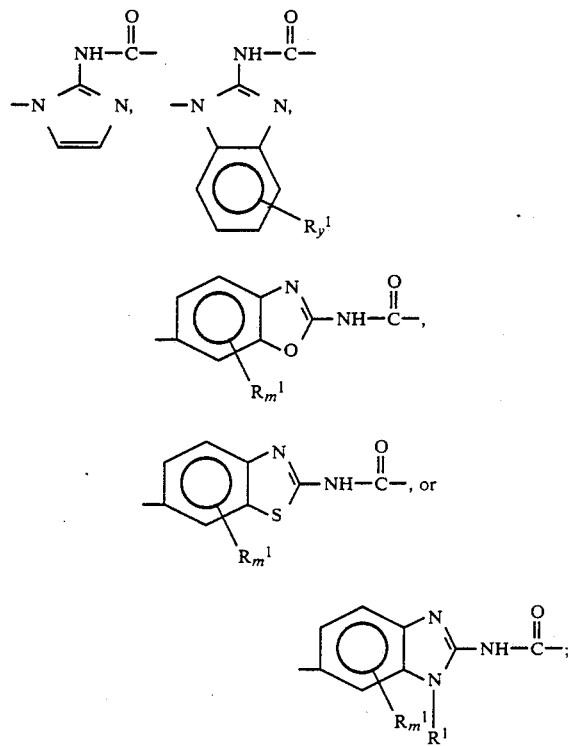

wherein each $R^1$ is a $C_{1-4}$ alkyl moiety, y is a whole number from 1 to 4, and m is a whole number from 1 to 3.

In a second aspect, this invention is a process for preparing a polymer comprising a backbone portion containing at least one amide moiety and a plurality of imidazole, benzimidazole, benzoxazole, or benzothiazole moieties, which comprises contacting a polyisocyanate with a compound containing at least two end moieties selected from the following: imidazole, benzimidazole, benzoxazole, or benzothiazole, under reaction conditions sufficient to form the corresponding polymer containing amide moieties.

In a third aspect, this invention is a urethane and/or urea polymer comprising a backbone portion containing at least one urea or urethane moiety, at least one amide moiety, and a plurality of imidazole, benzimidazole, benzoxazole, or benzothiazole moieties.

The process of the invention is suitable for the preparation of thermoset polymers which are advantageously free of surface defects, since a solvent is not required and no volatiles are evolved during the curing process.

DETAILED DESCRIPTION OF THE INVENTION

The polymers of the first aspect of the invention comprise a backbone portion containing at least one of the following units:

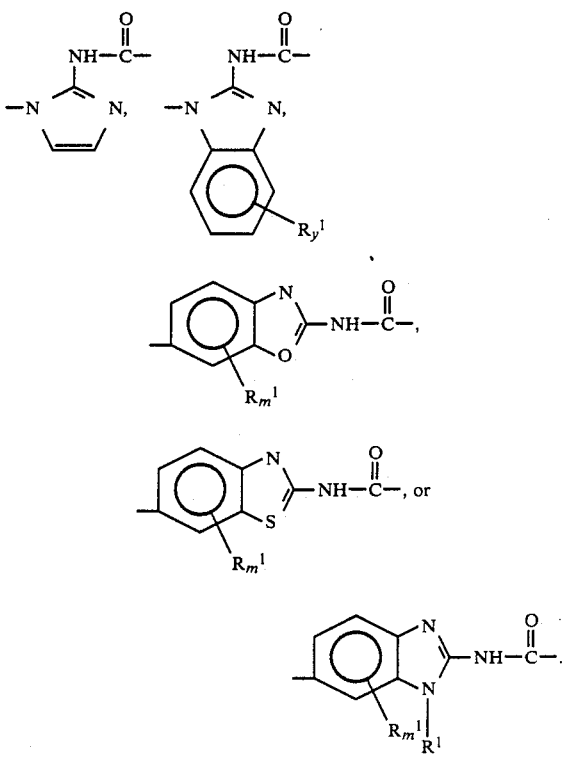

wherein each $R^1$ is a $C_{1-4}$ alkyl moiety, y is a whole number from 1 to 4, and m is a whole number from 1 to 3. The other ring carbon atoms may be substituted with a $C_{1-4}$ alkyl moiety, but are preferably unsubstituted. The recurring unit is most preferably:

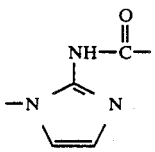

These polymers which contain amide moieties and imidazole, benzimidazole, benzoxazole, or benzothiazole moieties, may be prepared by contacting a polyisocyanate with a compound containing at least two end moieties selected from the following: imidazole, benzimidazole, benzoxazole, or benzothiazole under reaction conditions sufficient to form the corresponding polymer containing amide moieties. Preferably, these compounds are of the following formula:

$$R^1\text{---}(R^2)_x \quad \quad (I)$$

wherein $R^1$ is a substituted or unsubstituted hydrocarbon radical which does not interfere with the reaction, and is preferably $C_{1-10}$ alkyl, $C_{1-10}$ alkyleneoxy, or trimethylbenzyl; $R^2$ is separately in each occurrence a moiety of the following formula:

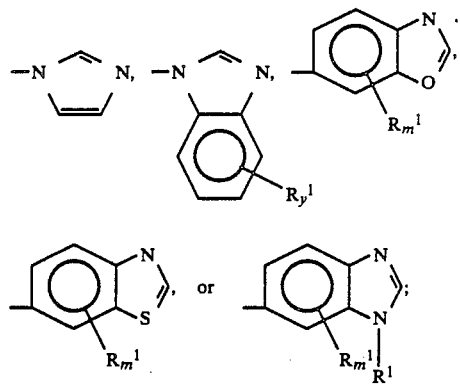

wherein each $R^1$ is a $C_{1-4}$ alkyl moiety, y is a whole number from 1 to 4, m is a whole number from 1 to 3, and x is an integer from 2–3. The other ring carbon atoms may be substituted with a $C_{1-4}$ alkyl moiety, but are preferably unsubstituted. Preferably, $R^1$ is a $C_{2-6}$ alkyl, a dialkylether, or trimethylbenzyl, and more preferably is butyl, hexyl, diethylether, or trimethylbenzyl, and most preferably is butyl. $R^2$ is most preferably

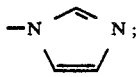

and x is most preferably 2. Preferably, $R^1$ is a $C_{2-6}$ alkyl, a dialkylether, or trimethylbenzyl, and more preferably is butyl, hexyl, diethylether, or trimethylbenzyl, and most preferably is butyl.

Suitable polyisocyanates include aliphatic or aromatic polyisocyanates or mixtures thereof. For example, any polyisocyanate having 2 or more NCO moieties per molecule may be used. Aromatic polyisooyanates are preferred for their higher reactivity and suitability in RIM applications, relative to aliphatic isocyanates. Examples of such compounds include toluene-2,4-and-2,6-diisocyanate, 2,2'-, 2,4'-, and 4,4'-methylene bis(phenyl isocyanate), polymethylene poly(phenyl isocyanate), and mixtures of these isocyanates. The preferred isocyanates include derivatives of 4,4'-methylene bis(phenyl isocyanate) and polymethylene poly(phenyl isocyanate), or mixtures thereof. When mixtures of 4,4'-methylene bis(phenyl isocyanate) and polymethylene poly(phenyl isocyanate) are used, the glass transition temperature of the polymer can be controlled by varying the ratio of the two isocyanates employed. In general, the higher the amount of polymethylene poly(phenyl isocyanate), the higher the glass transition temperature of the resulting polymer, as shown in the table below.

TABLE I

| Glass Transition Temperatures of Polyamide Polymers | |
|---|---|
| Molar Ratio of Polymethylene Polyisocyanate (°C.) to 4,4'-Methylene Bis(Phenyl Isocyanate) | Tg |
| 1:0 | 160 |
| 1:1 | 148 |
| 1:2 | 131 |
| 1:6 | 109 |

The bisimidazoles shown in formula (I) may be prepared by reacting imidazole with a dihalo-functional substituted or unsubstituted hydrocarbon, which is preferably a $C_{1-10}$ dihaloalkane. More preferably, the imidazole is reacted with a $C_{1-5}$ dihaloalkane, and most preferably with a 1,4-dichlorobutane. The molar ratio of imidazole:dihaloalkane is preferably at least about 2:1 Preferably, the reaction is carried out in the presence of a metal hydroxide such as sodium hydroxide, potassium hydroxide, or calcium hydroxide, and is more preferably carried out in the presence of a 50–85 percent solution of sodium hydroxide. Most preferably, the solution of sodium hydroxide is an 85 percent Preferably, the metal hydroxide is present in a molar ratio in the range of from about 0.1:1.0 to about 1:1, more preferably in the range from about 0.7:1 to about 1:1, and most preferably about 1:1, relative to the amount of imidazole.

When a metal hydroxide is contacted with the imidazole, it will advantageously dissociate one of the acidic protons from the imidazole ring to form water. Such water is preferably removed from the reaction mixture by azeotropic distillation with the addition of a solvent capable of forming an azeotropic mixture with water, which is preferably an aromatic solvent. Suitable solvents include toluene and benzene, and are preferably employed in a molar ratio of about 1:10 to about 10:1, relative to the amount of imidazole.

The reaction is also preferably carried out in the presence of an organic polar solvent, such as, for example, dimethyl sulfoxide (DMSO), dimethylformamide, and dimethyl acetamide. Most preferably, DMSO is used as the polar solvent. Such solvent is preferably employed in a molar ratio of about 1:10 to about 20:1, relative to the amount of imidazole.

Bisdibenzimidazoles may be prepared from unsubstituted benzimidazoles using the same procedure described above, optionally in the presence of an acetone solvent and an electrophilic diiodoalkane. Bisdibenzoxazoles, bisdibenzothiazoles, and bisdibenzimidazoles may be prepared in a similar reaction using 1-alkyl benzimidazoles in a Friedel-Crafts reaction using acid chlorides and Lewis acids. In such a procedure, benzoxazole, benzothiazole, or 1-alkyl benzimidazole is contacted with a bifunctional acid chloride such as, for example, terephthaloyl chloride in the presence of a Lewis acid such as, for example, aluminum chloride or iron chloride, under conditions sufficient to form the corresponding bisdibenzoxazole, bisdibenzothiazole, or bisdibenzimidazole. A process for the N-Alkylation of benzimidazoles is described in Kikugawa, G., "A Facile N-Alkylation of Imidazoles and Bisimidazoles," Synthesis, February 1981, pp. 124–25.

Alternatively, bisdibenzimidazoles may be prepared by the diazotization of 5- or 6-aminobenzimidazole azole which is synthesized by the reduction of 5- or 6-nitrobenzimidazole as described in Nazarov, V. N. and V. I. Krashnoshtan, "Synthesis of 5,5' (or 6,6')-Bibenzimidazole from Non-Carcinogenic Compounds", 52 Tr.Mosk. Khim.-TekhnoLInst. 110–11 (1967), the relevant portions of which are incorporated by reference. Bisdibenzoxazoles and bisdibenzothiazoles may also be prepared in a similar procedure from the corresponding nitrobenzoxazole and nitrobenzothiazole compounds.

In the process for preparing the polymers of the first aspect of the invention, the isocyanate and bisimidazole, bisdibenzimidazole, bisdibenzoxazole, or bisdibenzothiazole are preferably present in amounts such that the ratio of isocyanate functionalities to imidazole, benzimidazole, benzoxazole, or benzothiazole moieties in the reaction mixture is in the range from about 1.25:1 to about 1:1, more preferably from about 1.1:1 to about 1:1, and most preferably about 1:1.

The reaction may be conducted at any temperature which will allow the reaction to proceed, but is preferably above about 25° C., more preferably above about 160° C., and most preferably above about 180° C., and is preferably below about 240° C., and more preferably below about 230° C. Lower temperatures may be used, but may require the use of an inert solvent, such as, for example, N-methyl-2-pyrrolidone. The reaction may be conducted at any pressure which will allow the reaction to proceed, but is preferably in the range of from about 30 psi to about 10,000 psi, and more preferably in the range of from about 200 to about 4,000 psi. The duration of the process is preferably at least about 15 minutes, and more preferably at least about 30 minutes, and is preferably no longer than about 6 hours, more preferably no longer than about 5 hours, and most preferably no longer than about 4 hours.

Preferably the glass transition temperature of the product of the reaction is at least about 25° C., more preferably at least about 50° C., and most preferably at least about 100° C. The molecular weight of the polymer of this first aspect of the invention is preferably at least about 5,000, more preferably at least about 10,000, and most preferably at least about 20,000. The polymers of the first aspect of the invention are advantageously highly resistant to solvents. A polymer prepared from 1,6-hexamethylene-N,N'-diimidazole and a 2 to 1 mixture of diphenylmethane-4,4'-diisocyanate (MDI) and PAPI 580 ™ polymethylene poly(phenylisocyanate) is insoluble in methanol, tetrahydrofuran, and ethyl acetate, and swells in carbon tetrachloride.

The polymers of the first aspect of the invention may also be prepared as an isocyanate-functional prepolymer. These prepolymers are the reaction product of a compound containing at least two end moieties selected from the following: imidazole, benzimidazole, benzoxazole, and benzothiazole with an excess over stoichiometry of a polyisocyanate. These prepolymers are prepared in the same manner as the polymers of the invention, except that an excess over stoichiometry of the polyisocyanate is employed to make an isocyanate-functional prepolymer. In the process for preparing these prepolymers, the isocyanate and bisimidazole, bisdibenzimidazole, bisdibenzoxazole, or bisdibenzothiazole are preferably present in amounts such that the ratio of isocyanate functionalities to imidazole, benzimidazole, benzoxazole, or benzothiazole moieties in the reaction mixture is in the range from about 1.3:1 to about 2:1, more preferably in the range of from about 1.3:1 to about 1.5:1, and is most preferably about 1.3:1. These prepolymers preferably have isocyanate functionalities in the range of from about 2 to about 4, more preferably in the range of from about 2 to about 3, and most preferably in the range of from about 2 to about 2.2.

In a third aspect, this invention is a urethane and/or urea polymer containing at least one urea or urethane moiety, amide moieties, and imidazole, benzimidazole, benzoxazole, or benzothiazole moieties. This polymer may be prepared by the reaction of an isocyanate-functional prepolymer containing amide moieties and imidazole, benzimidazole, benzoxazole, or benzothiazole moieties with a polyahl or mixtures of polyahls. A polyahl is a compound having a plurality of active hydrogen moieties that are reactive with the Zerewitinoff reagent such as, for example, hydroxy moieties or amine moieties. Many such polyahls of a lower molecular weight are commonly called chain-extenders when used with isocyanate-functional prepolymers and are optionally employed with catalysts and a variety of other additives. High molecular weight polyahls can also be used. Examples of such polyahls are described in U.S. Pat. No. 4,394,491, the relevant portions of which are hereby incorporated by reference.

The molecular weight of the urethane and/or urea polymer of this third aspect of the invention is preferably at least about 5,000, more preferably at least about 10,000, and most preferably at least about 20,000.

The chain-extenders useful to make the urethane and/or urea polymers of this invention are preferably difunctional. Mixtures of difunctional and trifunctional chain-extenders are also useful in this invention. The chain-extenders useful in this invention include diols, amino alcohols, diamines or mixtures thereof. Low molecular weight linear diols such as 1,4-butanediol and ethylene glycol have been found suitable for use in this invention. Other chain-extenders including cyclic diols such as 1,4-cyclohexanediol and 1,4-cyclohexanedimethanol: aromatic ring-containing diols such as bishydroxyethylhydroquinone: amide- or ester-containing diols or amino alcohols are useful. Aromatic diamines and aliphatic diamines are suitable chain-extenders. Examples include ethylenediamines, 1-(2-aminoisopropyl-4-methyl-4-aminocyclohexane), 1,2-propanediamine, 1,4-butanediamine; 1,6-hexanediamine, diethyltoluenediamine and 1,4-bis(aminomethyl)cyclohexane. Additional examples of useful chain-extenders can be found in U.S. Pat. No. 4,297,444: 4,202,957: 4,476,292: 4,495,309 and 4,218,543.

Catalysts such as tertiary amines or an organic tin compound or other polyurethane catalysts may be used. The organic tin compound may suitably be a stannous or stannic compound, such as stannous salt of a carboxylic acid, a trialkyltin oxide, a dialkyltin dihalide, a dialkyltin oxide, etc., wherein the organic moieties of the organic portion of the tin compound contain from 1 to 18 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used. Other catalysts include organo zinc, mercury and lead compounds. For some polymers, a catalyst is not needed.

Tertiary amine catalysts include trialkylamines (e.g., trimethylamine, triethylamine), heterocyclic amines, such as N-alkylmorpholines (e.g., N-methylmorpholine, N-ethylmorpholine, dimethyldiaminodiethyl ether, etc.), 1,4-dimethylpiperazine, triethylenediamine, etc., and aliphatic polyamines, such as N,N,N',N'-tetramethyl-1,3-butanediamine.

Optional additives include anti-foaming agents such as glycerine, an ethyl acrylate-2-ethylhexyl acrylate copolymer, dimethyl siloxane copolymers and silicones;

antioxidants such as esters of β-(3,5-di-tert-butyl-4-hydroxyphenyl) propionic acid with monohydric or polyhydric alcohols, for example, methanol, octadecanol, 1,6-hexanediol, neopentyl glycol, thiodiethylene glycol, diethylene glycol, triethylene glycol, pentaerythritol, tris-hydroxyethyl isocyanurate, and dihydroxyethyl oxalic acid diamine; UV absorbers and light stabilizers such as 2-(2'-hydroxyphenyl)benzotriazoles and sterically hindered amines such as bis-(2,2,6,6-tetramethylpiperidyl-sebacate, bis-(1,2,2,6,6-pentamethylpiperidyl)-sebacate, n-butyl-3,5-di-tert-butyl-4-hydroxybenzyl malonic acid, bis-(2,2,6,6-pentamethylpiperidyl)ester, condensation product of 1-hydroxyethyl-2,2,6,6-tetramethyl-4-hydroxypiperidine and succinic acid, condensation product of N,N'-(2,2,6,6-tetramethylpiperidyl)-hexamethylene diamine and 4-tert-octylamino-2,6-dichloro-1,3,5-s-triazine, tris(2,2,6,6-tetramethylpiperidyl)-nitrilotriacetate, tetrakis-(2,2,6,6-tetramethyl-4-piperidyl)-1,2,3,4-butane-tetracarbonic acid and 1,1'-(1,2-ethanediyl)-bis-(3,3,5,5-tetramethyl-piperazinone): plasticizers such as phthalates, adipates, glutarates, epoxidized vegetable oils, and the like; fungicides; pigments: dyes: reactive dyes: moisture scavengers: and the like. In addition, fillers and reinforcing materials such as chopped or milled glass fibers, chopped or milled carbon fibers and/or other mineral fibers are useful.

The urethane and/or urea polymers of the present invention can be fabricated by any fabrication technique known in the art. Useful processes include hand casting (see, for example, U.S. Pat. No. 4,476,292) and reaction injection molding (see, for example, U.S. Pat. Nos. 4,297,444 and 4,495,309). The relevant portions of these references are hereby incorporated by reference. The urethane and/or urea polymers of this invention are useful in the production of structural parts for automotive applications such as fenders, doors and body panels as well as in other applications such as computer housings, sports equipment and the like.

ILLUSTRATIVE EMBODIMENTS

The following examples are given to illustrate the invention and should not be interpreted as limiting it in any way. Unless stated otherwise, all parts and percentages are given by weight.

EXAMPLE 1

Reaction of 1,4-Tetramethylene-N,N'-diimidazole with Methylenediphenylisocyanate Preparation of 1,4-Tetramethylene-N,N'-diimidazole Imidazole (68 g, 1 mole), 50 percent NaOH solution (80 g, 1 mole), toluene (120 ml), and DMSO (120 ml) are mixed and heated until all of the water is removed. 1,4-Dichlorobutane (63.5 g, 0.5 mole) is added and the mixture is stirred at 60° C. for 2 hours. Sodium chloride is removed by filtration and DMSO is removed by distillation. The resulting liquid is poured into 300 ml of water. A white solid forms immediately which weighs 93 g after drying, for a 95 percent yield. NMR, IR, and Mass Spectrometry are consistent with the structure of 1,4-tetramethylene-N,N'-diimidazole which may be used without further purification.

Polyamide Formation 1,4-Tetramethylene-N,N'-diimidazole (51.57 g) is heated at 80° C. under vacuum for 24 hours and then heated to 130° C. Diphenylmethane-4,4'-diisocyanate (MDI) (45 g) and PAPI 580 TM polymethylene poly(phenylisocyanate) (24.6 g) are mixed, heated to melt and added to the diimidazole with stirring. A solid is formed in the reaction mixture almost immediately. The solid is heated to melt at 180° C. and then degassed under vacuum. After 5 minutes, the melted solid becomes viscous. It is poured into a 3.5×6" mold for further curing. The mold is heated at 220° C. under 800 psi pressure for 2.5 hours. The mold is allowed to cool and the pressure is released. The resulting polymer has the following properties:

| Flexural modulus | 438 ksi |
|---|---|
| Flexural strength | 16.1 ksi |
| Izod | .8 ft-lb/in |
| Tensile modulus | 200 ksi |
| Tensile strength | 4 ksi |
| Elongation at break | 2.2% |
| Tg | 131° C. |

TGA shows 2 percent weight loss at 325° C. under nitrogen and at 311° C. in air.

EXAMPLE 2

Preparation of Polyamide from 1,6-Hexamethylene-N,N'-diimidazole and a 2 to 1 Mixture of Diphenylmethane-4,4'-diisocyanate (MDI) and PAPI 580 TM Polymethylene Poly(phenylisopoly(phenyl isocyanate)

1,6-Hexamethylene-N,N'-diimidazole (40.6 g) is prepared using the same procedure of Example 2 using 1,6-dichlorohexane, and is heated at 90° C. under vacuum for 17 hours. The temperature is increased to 140° C. MDI (31 g) and PAPI 580 TM polymethylene poly(phenylisocyanate) (16.9 g) are melted and combined. The isocyanate liquid is then poured into the 1,6-hexamethylene-N,N'-diimidazole. The liquid mixture is stirred and heated to 150° C., and a vacuum is then applied. The mixture is then heated to 178° C. and becomes very viscous. The viscous liquid is poured into a 3.5–6" mold and compressed to a thickness of about ⅛". The mold is heated and the temperature increased from 170° C. to 205° C. in 20 minutes. The mold pressure is 800 psi. Polymerization is completed at 205° C. in 3 hours. The resulting polymer has the following properties:

| Flexural modulus | 380 ksi |
|---|---|
| Flexural strength | 17.3 ksi |
| Izod | 0.74 ft-lb/in |
| Tensile modulus | 390 ksi |
| Tensile strength | 5.6 ksi |
| Elongation at break | 1.5% |
| Tg | 123° C. |

EXAMPLE 3

Preparation of Polyamide from Bis-2-N-imidazoleethyl Ether and PAPI 580 TM Polymethylene Poly(phenylisocyanate)

Bis-2-N-imidazoleethyl ether (13.4 g) was heated at 60° C. under vacuum for 24 hours. The temperature was then increased to 120° C. and PAPI 580 TM polymethylene poly(phenylisocyanate) (17.8 g) was added. The mixture was stirred and degassed at 120° C. The solution is poured into a 0.5×3" mold, compressed to a thickness of about ⅛, and cured under pressure at 210°

C. for 2.5 hours. The resulting polymer has a flexural strength of 7.6 ksi and a flexural modulus of 450 ksi.

EXAMPLE 4

Reaction of 1,4-Tetramethylene-N,N'-dibenzimidazole with Polymethylene Poly(phenylisocyanate)

Preparation of 1,4-Tetramethylene-N,N'-dibenzimidazole

Powdered KOH (15.7 g) and benzimidazole (7 g) are mixed in 100 ml acetone. After five minutes, diiodobutane (9.27 g) is added. A solid forms after about an hour. The solid is collected, washed with water, and crystallized in ethanol. NMR and mass spectrometry are consistent with the structure of 1,4-tetramethylene-N,N'-dibenzimidazole.

Polyamide Formation 1,4-Tetramethylene-N,N'-dibenzimidazole (4.3 g) is dried under vacuum for 24 hours and then at 170° C. for 2 hours. PAPI 580 ™ polymethylene poly(phenylisocyanate) (4.1 g) is added and the mixture is stirred and degassed at 180° C. The mixture becomes very viscous after 10 minutes. It is poured into a mold and heated at 200° C. under 3 tons of pressure for 0.5 hour. The temperature is raised to 210° C. for 1 hour, and then raised to 220° C. for 1.5 hours, and then raised to 230° C. for 1 5 hours. The Tg of the polymer is 170° C.

What is claimed is:

1. A polymer comprising a backbone portion containing at least one of the following units:

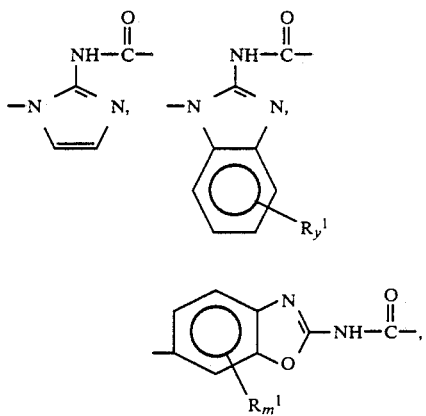

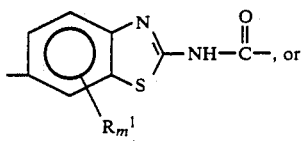

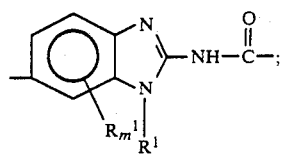

wherein each $R^1$ is a $C_{1-4}$ alkyl moiety, y is a whole number from 1 to 4, and m is a whole number from 1 to 3.

2. The polymer of claim 1 which has a molecular weight of at least about 5,000.

3. The polymer of claim 1 which additionally comprises isocyanate end moieties.

4. The polymer of claim 3 which has a molecular weight of at least about 5,000.

5. The polymer of claim 1 which comprises at least one imidazole moiety.

6. The polymer of claim 1 which comprises at least one benzimidazole moiety.

7. The polymer of claim 1 which comprises at least one benzoxazole moiety.

8. The polymer of claim 1 which comprises at least one benzothiazole moiety.

9. A process for preparing a polymer comprising a backbone portion containing at least one amide moiety and a plurality of imidazole, benzimidazole, benzoxazole, or benzothiazole moieties, which comprises contacting a polyisocyanate with a compound containing at least two end moieties selected from the following: imidazole, benzimidazole, benzoxazole, or benzothiazole, under reaction conditions sufficient to form the corresponding polymer containing amide moieties.

10. The process of claim 9 wherein the compound contains at least one imidazole moiety.

11. The process of claim 9 wherein the compound contains at least one benzimidazole moiety.

12. The process of claim 9 wherein the compound contains at least one benzoxazole moiety.

13. The process of claim 9 wherein the compound contains at least one benzothiazole moiety.

14. The urethane and/or urea polymer comprising a backbone portion containing at least one urea or urethane moiety, at least one amide moiety, and a plurality of imidazole, benzimidazole, benzoxazole, or benzothiazole moieties.

15. The polymer of claim 14 which has a molecular weight of at least about 5,000.

* * * * *

UNITED STATES PATENT AND TRADEMARK OFFICE
CERTIFICATE OF CORRECTION

PATENT NO. : 4,996,281  Page 1 of 5
DATED : February 26, 1991
INVENTOR(S) : Ying H. So It is certified that error appears in the above-identified patent and that said Letters Patent is hereby corrected as shown below:

On the title page, under References Cited, U.S. Patent Documents, " 3,625,992 " should correctly read -- 3,625,922 --.

Column 9, Claim 1, in the formula on line 49, " $R_y^1$ " should correctly read -- $R^1_y$ -- and should be properly connected in the following manner:

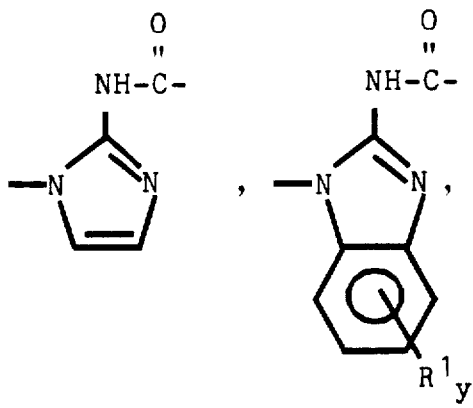

UNITED STATES PATENT AND TRADEMARK OFFICE
CERTIFICATE OF CORRECTION

PATENT NO. : 4,996,281
DATED : February 26, 1991
INVENTOR(S) : Ying H. So

It is certified that error appears in the above-identified patent and that said Letters Patent is hereby corrected as shown below:

Column 9, Claim 1, in the formula on line 56, " $R_m^1$ " should correctly read -- $R^1_m$ -- and should be properly connected in the following manner:

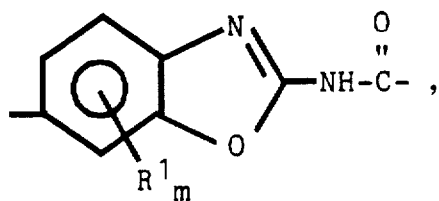

UNITED STATES PATENT AND TRADEMARK OFFICE
CERTIFICATE OF CORRECTION

PATENT NO. : 4,996,281
DATED : February 26, 1991
INVENTOR(S) : Ying H. So

It is certified that error appears in the above-identified patent and that said Letters Patent is hereby corrected as shown below:

Column 10, Claim 1, in the formula on line 7, " $R_m^1$ " should correctly read -- $R^1_m$ -- and should be properly connected in the following manner:

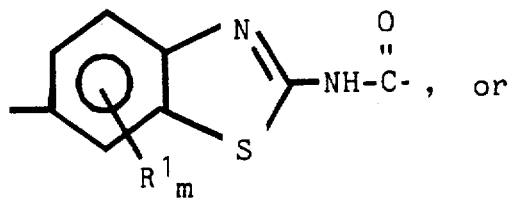

UNITED STATES PATENT AND TRADEMARK OFFICE
CERTIFICATE OF CORRECTION

PATENT NO. : 4,996,281

DATED : February 26, 1991

INVENTOR(S) : Ying H. So

It is certified that error appears in the above-identified patent and that said Letters Patent is hereby corrected as shown below:

Column 10, Claim 1, in the formula on line 14, " $R_m^1$ " should correctly read -- $R^1_m$ -- and should be properly connected in the following manner:

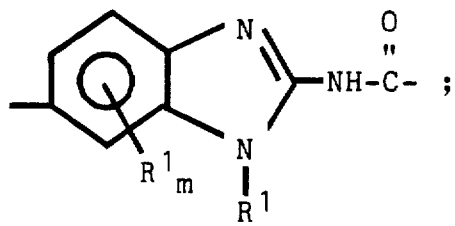

UNITED STATES PATENT AND TRADEMARK OFFICE
CERTIFICATE OF CORRECTION

PATENT NO. : 4,996,281

DATED : February 26, 1991

INVENTOR(S) : Ying H. So

It is certified that error appears in the above-identified patent and that said Letters Patent is hereby corrected as shown below:

Column 10, Claim 14, line 50, please delete the word " The " and replace it with the word -- A --.

Signed and Sealed this

First Day of December, 1992

*Attest:*

DOUGLAS B. COMER

*Attesting Officer*   *Acting Commissioner of Patents and Trademarks*